United States Patent
Xiao et al.

(10) Patent No.: US 9,158,636 B2
(45) Date of Patent: Oct. 13, 2015

(54) SERIAL ADVANCED TECHNOLOGY ATTACHMENT DUAL IN-LINE MEMORY MODULE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Gui-Fu Xiao, Shenzhen (CN); Peng Feng, Shenzhen (CN); Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 168 days.

(21) Appl. No.: 14/062,653

(22) Filed: Oct. 24, 2013

(65) Prior Publication Data

US 2015/0067388 A1     Mar. 5, 2015

(30) Foreign Application Priority Data

Aug. 27, 2013   (CN) .......................... 2013 1 03757305

(51) Int. Cl.
*G06F 11/00* (2006.01)
*G06F 11/20* (2006.01)
*G06F 11/14* (2006.01)

(52) U.S. Cl.
CPC ........ *G06F 11/2053* (2013.01); *G06F 11/1415* (2013.01)

(58) Field of Classification Search
CPC ............ G06F 11/2053; G06F 11/1415; G06F 11/1417; G06F 13/16; G06F 12/0246; G06F 3/0653
See application file for complete search history.

(56) References Cited

U.S. PATENT DOCUMENTS

| | | | |
|---|---|---|---|
| 6,195,695 B1 * | 2/2001 | Cheston et al. | 709/221 |
| 6,393,585 B1 * | 5/2002 | Houha et al. | 714/23 |
| 6,766,476 B2 * | 7/2004 | Matsufusa | 714/38.13 |
| 6,915,420 B2 * | 7/2005 | Hensley | 713/2 |
| 6,948,099 B1 * | 9/2005 | Tallam | 714/38.14 |
| 2003/0005277 A1 * | 1/2003 | Harding et al. | 713/2 |
| 2008/0270675 A1 * | 10/2008 | Nagaraj et al. | 711/100 |
| 2013/0254506 A1 * | 9/2013 | Berke et al. | 711/165 |

* cited by examiner

*Primary Examiner* — Yolanda L Wilson
(74) *Attorney, Agent, or Firm* — Novak Druce Connolly Bove + Quigg LLP

(57) ABSTRACT

A serial advanced technology attachment dual in-line memory module (SATA DIMM) device includes a circuit board. A storage chip is arranged on the circuit board and stores a first firmware. A memory is arranged on the circuit board and stores a second firmware. A control chip is arranged on the circuit board and connected to the memory, to read the second firmware from the memory and load the second firmware in the storage chip when the first firmware stored in the storage chip is damaged. The control chip is also connected to the storage chip, to control the storage chip to read or to write data.

7 Claims, 2 Drawing Sheets

SERIAL ADVANCED TECHNOLOGY ATTACHMENT DUAL IN-LINE MEMORY MODULE DEVICE

BACKGROUND

1. Technical Field

The present disclosure relates to a serial advanced technology attachment dual in-line memory module (SATA DIMM) device.

2. Description of Related Art

Solid state drives (SSD) store data on chips instead of on magnetic or optical discs and are used for adding storage capacity. One type of SSD has the form factor of a DIMM device and is called a SATA DIMM device. The SATA DIMM device can be inserted into a memory slot of a motherboard to receive voltages from the motherboard through the memory slot and receive hard disk drive (HDD) signals through SATA connectors arranged on the SATA DIMM device and connected to a SATA connector on the motherboard. However, when firmware stored in the storage chips of the SATA DIMM device are damaged, the SATA DIMM device will not be identified by the operation system and cannot be initialized. Thus, the SATA DIMM device needs to be returned to the manufacture for repair, this is time consuming and inconvenient. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one."

Figure 1:
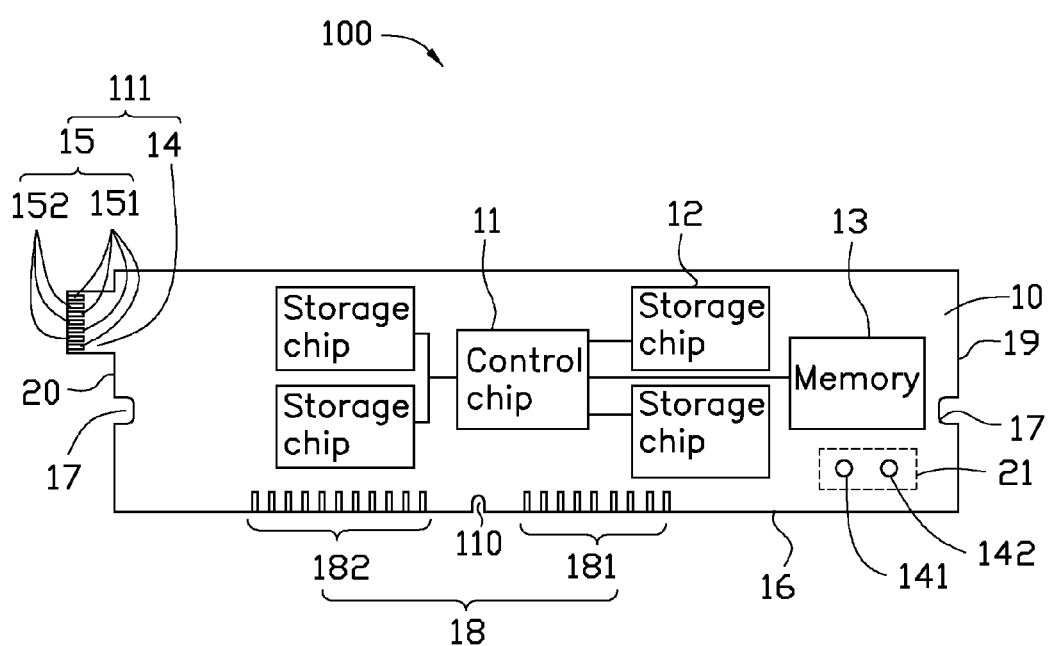
FIG. 1 is a side plan view of a serial advanced technology attachment dual in-line memory module (SATA DIMM) device in accordance with an embodiment of the present disclosure.
Figure 2:
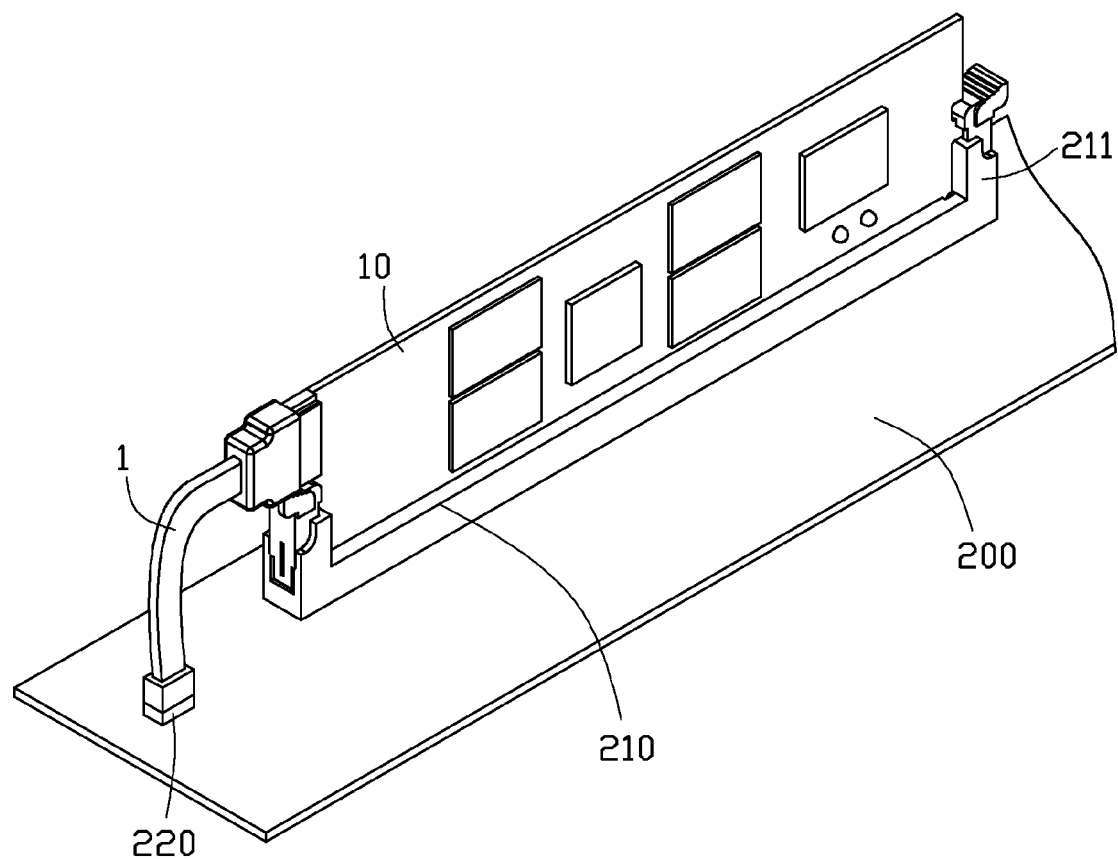
FIG. 2 is an assembled, isometric view of the SATA DIMM device of FIG. 1 connected to a motherboard.

FIGS. 1 and 2 show a serial advanced technology attachment dual in-line memory module (SATA DIMM) device 100 in accordance with an embodiment. The SATA DIMM device 100 includes a substantially rectangular circuit board 10. A control chip 11, a plurality of storage chips 12, a memory 13, and an indication unit 21 are all arranged on the circuit board 10. The storage chips 12 store a first firmware, and the memory 13 stores a second firmware. The control chip 11 is connected to the memory 13, to read the second firmware from the memory 13 and load the second firmware in the storage chips 12 when the first firmware stored in the storage chips 12 is damaged. The control chip 11 is also connected to the storage chips 12, to control the storage chips 12 to read or to write data. The indication unit 21 includes two indication lamps 141 and 142 connects to the control chip 11. In one embodiment, the indication lamp 141 is a red light emitting diode (LED), and the indication lamp 142 is a green LED. When the first firmware stored in the storage chips 12 is damaged, the control chip 11 controls the indication lamp 141 to be lit. When the second firmware is loaded in the storage chips 12, the control chip 11 controls the indication lamp 142 to be lit. In one embodiment, the memory 13 is an electrically erasable programmable read-only memory (EEPROM).

An extending board 14 is extended from a first end 20 of the circuit board 10 and coplanar with the circuit board 10. An edge connector 15 is arranged on the extending board 14. The edge connector 15 and the extending board 14 compose a storage device connector 111. The edge connector 15 includes a plurality of signal pins 151 and a plurality of ground pins 152. The signal pins 151 include a pair of signal input pins and a pair of signal output pins. The ground pins 152 include three ground pins. The signal pins 151 are connected to the control chip 11. The ground pins 152 are connected to a ground layer (not shown) of the circuit board 10. The edge connector 15 is in accordance with SATA standard.

An edge connector 18 and a notch 110 are arranged on a bottom side 16 of the circuit board 10, to be inserted into a memory slot 210 of a motherboard 200. The edge connector 18 includes a plurality of power pins 181 and a plurality of ground pins 182. The notch 110 is defined between the power pins 181 and the ground pins 182. The power pins 181 are connected to the control chip 11, the storage chips 12, and the memory 13, to provide voltages to the control chip 11, the storage chip 12, and the memory 13. The ground pins 182 are connected to the ground layer (not shown) of the circuit board 10. A groove 17 is defined in the first end 20 of the circuit board 10 and is positioned under the extending board 14. Another groove 17 is defined in a second end 19 of the circuit board 10 opposite to the first end 20.

In use, when the edge connector 18 is inserted into the memory slot 210 of the motherboard 200, fixing elements 211 of the memory slot 210 is engaged in the grooves 17, to fix the SATA DIMM device 100 in the memory slot 210. The storage device connector 111 is connected to a storage device port 220 through a cable 1 with two SATA connectors. When the motherboard 200 receives power, the motherboard 200 outputs voltages to the control chip 11, the storage chips 12, and the memory 13 through the memory slot 210 and the power pins 181. The control chip 11 tests the first firmware stored in the storage chips 12. When the first firmware is normal, the control chip 11 and the storage chips 12 are initialized. Then the motherboard 200 outputs SATA signals to the control chip 11 through the storage device port 220, the cable 1, and the storage device connector 111, to signal the control chip 11 to control the storage chips 12 to read or to write data. When the first firmware is damaged, the control chip 11 controls the indication lamp 141 to be lit and loads the second firmware from the memory 13 to the storage chips 12. The control chip 11 controls the indication lamp 142 to be lit after the second firmware is loaded in the storage chips 12. When the motherboard 200 receives power again, the motherboard 200 outputs voltages to the control chip 11, the storage chips 12, and the memory 13 through the memory slot 210 and the power pins 181. The control chip 11 and the storage chips 12 are initialized, and then, the motherboard 200 outputs SATA signals to the control chip 11 through the storage device port 220, the cable 1, and the storage device connector 111, to control the storage chips 12 to read or to write data.

The SATA DIMM device 100 can test whether the first firmware stored in the storage chips 12 is damaged through the control chip 11. The control chip 11 controls the indication lamp 141 to be lit and loads the second firmware from the memory 13 to the storage chips 12 when the first firmware stored in the storage chips 12 is damaged, and controls the indication lamp 142 to be lit after the second firmware is loaded in the storage chips 12. The SATA DIMM device 100 can test the first firmware stored in the storage chips 12 and substitute another firmware for the damaged firmware automatically, which is convenient in use.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment dual in-line memory module (SATA DIMM) device comprising:
   a circuit board;
   a plurality of storage chips arranged on the circuit board and storing a first firmware;
   a memory arranged on the circuit board and storing a second firmware; and
   a control chip arranged on the circuit board and connected to the memory and the plurality of storage chips, to read the second firmware from the memory and load the second firmware in the plurality of storage chips when the first firmware stored in the plurality of storage chips is damaged, the control chip also controls the plurality of storage chips to read or to write data.

2. The SATA DIMM device of claim 1, wherein an extending board is extended from a first end of the circuit board and coplanar with the circuit board, wherein a first edge connector is arranged on the extending board and communicates with a storage device port of a motherboard, the first edge connector comprises a plurality of first signal pins connected to the control chip and a plurality of first ground pins grounded; a second edge connector and a notch are arranged on a bottom side of the circuit board, to be inserted into a memory slot of the motherboard, the second edge connector comprises a plurality of second power pins and a plurality of second ground pins, the plurality of second power pins is connected to the control chip, the plurality of storage chips, and the memory, the plurality of second ground pins is grounded.

3. The SATA DIMM device of claim 1, wherein the extending board and the first edge connector compose a storage device connector, the storage device connector is in accordance with SATA standard.

4. The SATA DIMM device of claim 1, wherein the plurality of first signal pins comprises a pair of signal input pins and a pair of signal output pins, the plurality of first ground pins comprises three ground pins.

5. The SATA DIMM device of claim 1, further comprising an indication unit, wherein the indication unit comprises first and second indication lamps connected to the control chip, when the first firmware stored in the plurality of storage chips is damaged, the control chip controls the first indication lamp to be lit; when the second firmware stored in the memory is loaded in the plurality of storage chips, the control chip controls the second indication lamp to be lit.

6. The SATA DIMM device of claim 5, wherein the first indication lamp is a red light emitting diode (LED), the second indication lamp is a green LED.

7. The SATA DIMM device of claim 1, wherein the memory is an electrically erasable programmable read-only memory.

* * * * *